United States Patent
Szulyk et al.

(10) Patent No.: US 6,459,228 B1
(45) Date of Patent: Oct. 1, 2002

(54) DUAL INPUT SERVO COUPLED CONTROL STICKS

(75) Inventors: Zenon Szulyk, Mount Prospect; Brian Dyra, Elmhurst; Alex Makhlin, Skokie, all of IL (US)

(73) Assignee: MPC Products Corporation, Niles, IL (US)

( * ) Notice: Subject to any disclaimer, the term of this patent is extended or adjusted under 35 U.S.C. 154(b) by 13 days.

(21) Appl. No.: 09/815,117

(22) Filed: Mar. 22, 2001

(51) Int. Cl.[7] .................................................. G05B 5/01
(52) U.S. Cl. ....................... 318/632; 318/618; 244/191; 244/76 R; 244/223
(58) Field of Search ................................ 318/139, 618, 318/632; 244/17.13, 191, 223, 76 R; 701/4; 74/471 XY

(56) References Cited

U.S. PATENT DOCUMENTS

| | | | |
|---|---|---|---|
| 3,578,267 A | 5/1971 | Kazmarek | |
| 3,586,894 A | 6/1971 | Mueller | |
| 3,591,110 A | 7/1971 | Dramer | |
| 3,620,488 A | 11/1971 | Miller | |
| 3,730,132 A | 5/1973 | Brown | |
| 3,743,221 A | 7/1973 | Lykken | |
| 3,941,001 A | 3/1976 | LaSarge | |
| 4,895,039 A | 1/1990 | Hegg | |
| 4,913,000 A | 4/1990 | Wyllie | |
| 4,914,976 A | 4/1990 | Wyllie | |
| 4,947,701 A | 8/1990 | Hegg | |
| 4,962,448 A | 10/1990 | DeMaio | |
| 5,059,545 A | 10/1991 | Frensley | |
| 5,142,931 A | 9/1992 | Menahem | |
| 5,182,961 A | 2/1993 | Menahem | |
| 5,223,709 A | 6/1993 | Pettypiece | |
| 5,223,776 A | 6/1993 | Radke | |
| 5,243,873 A | 9/1993 | Demers | |
| 5,264,768 A | 11/1993 | Gregory | |
| 5,291,113 A | 3/1994 | Hegg | |
| 5,347,204 A * | 9/1994 | Gregory et al. | 318/632 |
| 5,377,109 A | 12/1994 | Baker | |
| 5,412,299 A | 5/1995 | Gregory | |
| 5,414,620 A | 5/1995 | Kauffman | |
| 5,456,428 A | 10/1995 | Hegg | |
| 5,473,235 A | 12/1995 | Lance | |
| 5,559,415 A | 9/1996 | Gregory | |
| 5,694,014 A | 12/1997 | Hegg | |
| 5,796,927 A | 8/1998 | Hegg | |
| 6,189,836 B1 * | 2/2001 | Gold et al. | 244/191 |

* cited by examiner

Primary Examiner—Khanh Dang
(74) Attorney, Agent, or Firm—Michael Best & Friedrich, LLC

(57) ABSTRACT

The present invention provides an active control system for coupling the movements of a pair of independently operated manual input devices such as dual flight control sticks operated by a pilot and co-pilot flying an aircraft. Each input device is configured to receive manual input data in the form of angular displacement of the device about one or more rotational axes. The active control system provides desired tactile feedback to an operator who displaces one of the manual input devices in the form of a restorative centering force. If an external system such as an auto-pilot system is engaged, the restorative force may be in a direction necessary to reconcile manual displacement of the input device with a position commanded by the external system, rather than directed toward the center position. The system also acts to reflect manual displacement of each input device as a force applied to the other. For example, when a pilot moves his or her control stick forward, the co-pilot will feel a like force tending to move the co-pilot's control stick forward.

23 Claims, 3 Drawing Sheets

DUAL INPUT SERVO COUPLED CONTROL STICKS

BACKGROUND OF THE INVENTION

The present invention relates to an active control system for providing desired force versus displacement characteristics to a pair of manual input devices such as the flight control sticks operated by a pilot and co-pilot flying an aircraft. In addition to providing a desired force versus displacement profile for the input devices, the active control system further acts to reflect manual inputs applied at one of the input devices at the other of the two input devices. Additionally, inputs from an outside source, such as an autopilot signal, can be used to reflect motion onto both control sticks. Variable gain velocity damping is also provided to reduce oscillations at or near a zero or null position.

In many applications it is desirable to impart tactile feedback to users of manually operated input devices. For example, in mechanically linked systems, tactile feedback to the operator is provided as a result of the force required to move the mechanical parts associated with the system. In electronically controlled systems, however, the physical interrelationship between the input device and the mechanical components acted upon is replaced by electrical signals generated by sensors in the input device which signal actuators to act on the mechanical components. In such systems, the force versus displacement characteristics of the input device have no direct relationship to the systems being controlled. It is thus desirable to generate mechanical forces to be applied to the input device to emulate mechanically linked systems. Such emulation provides the operator with tactile feedback regarding the state of the system and the effects of his or her input actions. Heretofore, self-centering control sticks having force versus displacement characteristics that emulate mechanical systems have employed mechanical spring arrangements or active servo control systems.

Aircraft flight control systems are an application where it is particularly important to provide accurate tactile feedback to the pilot or co-pilot operating a control stick or yoke which electrically interfaces with the mechanical systems for controlling the flight control surfaces of the aircraft. Such "fly by wire" systems employ various sensors to determine the position of and/or force applied to the control stick in order to translate the pilot's input commands into electrical signals for controlling the flight control surfaces of the aircraft. In many aircraft, dual control sticks are provided, one to be operated by the pilot and a second to be operated by a co-pilot. In cases where there are dual control sticks, it is desirable that actions taken on either one of the control sticks are reflected in the other control stick in the form of a force supplied to the second control stick in the direction of the action taken on the first control stick.

An active control system for providing variable force feel characteristics to a pair of manual input control stick is disclosed in U.S. Pat. No. 5,291,113 to Hegg et al. According to the system disclosed there, a desired force versus displacement profile is provided in which the magnitude of the control stick displacement is proportional to the force applied in order to emulate a purely mechanically linked system. The system includes a pair of control sticks each of which is directly coupled through a gimble to a motor in a conventional manner. A position signal from the first input device is fed back and combined with an autopilot or center position signal to create an error signal. This error signal is amplified and input to servo control electronics to generate excitation currents for a motor coupled to the control stick. Thus, this position feedback loop causes the motor to drive the control stick in a direction to reduce the amount of error between the position commanded by the autopilot signal and the actual position of the control stick. The gain of the amplifier that acts on the difference between the stick position and the autopilot reference command in Hegg, et al. is fixed, and serves to define the mechanical spring rate being emulated, resulting in a single force-versus-displacement gradient profile.

A second position signal generated from the position of the second control stick is also fed back and summed with the position signal from the first control stick. This signal is also amplified and summed with the error signal input to the servo controller driving the motor coupled to the first control stick. The signal representing the combined position signal from the first and second control sticks is amplified to a far greater extent than the error signal between the autopilot signal in the position of the first control stick. Thus, the position error signal between the first and second control sticks will dominate over the position error signal between the autopilot signal and the first control sticks. The motor coupled to the first control stick will drive the first control stick to a position intended to eliminate the position error between the first and second control sticks, as well as attempting to reconcile the position between the first control stick and the position commanded by the autopilot signal, with elimination of the position error between the two control sticks predominating.

The position signals from both the first and second control sticks are also in fed into the servo control electronics driving the motor coupled to the second control stick. Thus, displacement of the first control stick will also be reflected back to the second control stick. Discrepancies between the autopilot signal and the second control stick are rectified by having the second control stick follow the position of the first control stick. The operational characteristics of such a system are poor since the system relies on the reconciled position of one stick as the signal to drive the other. This can cause poor frequency response, lag in position tracking, poor coupling and poor feel.

A second embodiment disclosed by Hegg et al. further describes a torque sensor for generating a signal representative of the torque applied to the first and second control sticks. These signals are fed back and summed with the position error signals which are input to the servo control electronics driving the motors which are coupled to the first and second control sticks.

Another example of an active control system for controlling the force feel characteristics of a manual input device such as a flight control stick is disclosed in U.S. Pat. No. 5,347,204 Gregory et al. A system is disclosed there for providing variable damping to a servo control system in order to prevent oscillations due to motor torque and high gain characteristics at or near the center position. A signal representing the angular velocity of the control stick is combined with the position error signal which is supplied to the servo control electronics driving the motor coupled to the control stick. The velocity feedback signal is subjected to position dependent scaling which provides a variable rate gain which is dependent on the angular position of the control stick. The position dependent scaling is implemented via an amplifier inserted in the velocity feedback loop. The gain of the amplifier is established by a pair of resistors connected in parallel between one of the inputs and the output of the amplifier. A position dependent switch is connected in series with one of the resistors such that when the control sticks is positioned within a first position range the switch is open, and the gain of the amplifier is determined by only one of the resistors connected across the input and output of the amplifier. When the control stick is in a second position range, the switch is closed and the gain of the amplifier is determined by the parallel combination of the two resistors. Thus, a higher gain setting for the feedback amplifier may be established when the control stick is near the zero position to provide higher rate damping for the overall servo loop when the control stick is near the zero position, and less rate damping as the control stick is moved away from zero in order to improve the response characteristics of the system.

The present invention provides significant advantages over prior art active control systems for dual input control devices. The active control system of the present invention provides for multi-shaped force versus displacement profiles in a simpler, less expensive manner than the prior art. The present system provides excellent frequency response with little or no lag in position tracking, strong coupling between the input devices, with whatever tactile response is desired. All of these features are provided without the added cost and complexity of single or redundant multiple force or torque sensors. Thus, the system is less expensive and more reliable than prior art active control systems.

SUMMARY OF THE INVENTION

The present invention relates to an active control system for tactile feedback to an operator employing a manual input device such as a flight control stick used for flying an aircraft. Specifically, the invention provides desired force versus displacement characteristics to each of a pair of input devices, such as the pilot's and co-pilot's flight control sticks. In addition to supplying a centering force to urge the input devices back toward a predefined center position when the input devices are manually displaced, the active control system will also act to reconcile the positions of the two input devices with a command signal received from an external source such as an autopilot. Finally, differences in position between the first and second input devices are reflected back to each other by way of a restoring torque which tends to force each input device in the direction of the position of the other. Thus, if one operator, such as a pilot moves his or her flight control stick, the pilot's action will be reflected as a force applied to the co-pilot's control stick in the direction in which the position of the pilot's control stick varies from the position of the co-pilot's control stick.

Each input device is configured to receive a manual torque input for angularly displacing the input device about a control axis. Each input device may include more than one control axis. For instance, a single flight control stick may be configured to receive manual input for controlling the pitch, roll, and yaw of an aircraft, by moving the control stick relative to three separate control axes. In cases where the input device comprises multiple control axes, the active control system of the present invention may be duplicated on each axis. However, for the sake of brevity and clarity, the system is described herein as applied to only a single control axis of each input device.

A servo motor is coupled to each of the first and second input devices in a manner whereby the motor can apply torque about the control axes of the two input devices. As will be described below, the torque applied by the motors will generally be a restorative torque directed toward returning the input devices to a center or null position, or toward reconciling the position of the input devices with a position command signal supplied by an external system such as another side stick or the autopilot system.

First and second servo control loops are associated with the first and second motors respectively. Each servo control loop comprises a position sensor for generating a position signal indicative of the angular position of the corresponding input device. A force profile gain amplifier and a servo controller are also included in the first and second servo control loops. The force profile gain amplifier receives a position error signal derived by subtracting the angular position signal output by the position sensor from the command signal received from an external system. If the external system is not operable or not present, the position error signal merely becomes the negative of the position signal.

The gain of the force profile amplifier is variable, and is a function of the angular position of the input device which is fed back to the force profile gain amplifier from the position sensor. This technique allows shaping of the force profile to include multiple segments of different shapes, not limited to, but including: breakout regions, main gradient, soft stop, post-soft-stop gradient, and hard stop. All of these features can be modifiable in real-time in terms of their magnitude and position.

A torque error signal is output from the force profile amplifier and input to the servo controller. The servo controller converts the torque error signal to current for driving the motor. The polarity and magnitude of the motor drive current are such as to drive the motor in a direction opposite the direction of displacement of the associated input device, with a restorative torque proportional to the amount of displacement.

A cross-coupling feedback loop is also provided for reflecting the relative positions of the first and second input devices in the torque error signal input to the servo controllers associated with the first and second servo control loops. This has the effect of altering the torque applied to the first and second input devices to reflect a force directed toward reconciling the positions of the first and second input devices.

Each of the first and second servo control loops includes a velocity damping loop. The amount of velocity damping is dependent on the velocity of the associated input device. An angular velocity signal proportional to the angular velocity of the input device is fed back to a velocity damping profile amplifier both as an input signal, and as the signal to be amplified. The variable gain of the damping profile increases with the velocity of the respective input device. Thus, the faster the input device is moved, the greater the damping applied. The output of the profile damping amplifier is subtracted from the torque error signal and acts to smooth the torque characteristics applied to the input device.

The cross-coupling feedback loop includes a relative position signal representing the difference between the angular position signal of the second input device and the angular position signal of the first input device. A proportional gain amplifier amplifies the relative position signal, and an integrating amplifier integrates and amplifies the relative position signal. Also, a relative velocity signal is included in the cross-coupled feedback loop. The relative velocity signal is obtained by taking the difference between the first input device angular velocity signal and the second input device angular velocity signal. A signal summing device adds the integrated relative position signal output from the integrating amplifier to the proportionally amplified relative position signal output from the proportional gain amplifier and subtracts the relative velocity signal. The resultant cross-coupled position signal is input to a cross-coupled damping amplifier, the output of which is added to the torque error signal of one of the first and second servo control loops and subtracted from the other of the first and second servo control loops.

DETAILED DESCRIPTION OF THE INVENTION

The present invention provides an active control system for coupling the movements of a pair of independently operated manual input devices such as dual flight control sticks operated by a pilot and co-pilot flying an aircraft. Each input device is configured to receive manual input data in the form of angular displacement of the device about one or more rotational axes. The active control system of the present invention may be applied independently to each input axis associated with the manual input device, such as pitch, roll or yaw when the system is applied to the flight control sticks of an aircraft. For the sake of clarity the present description will be limited to a single control axis of each manual input device with the understanding that the system may be duplicated on additional control axes.

The active control system of the present invention provides desired tactile feedback to an operator who displaces one of the manual input devices. The system provides a restorative centering force to the input device when an operator manually displaces the input device from an arbitrarily defined null position. Preferably the control system provides a force versus displacement curve or "force profile" that emulates a mechanical spring system wherein the restorative force increases with increased displacement of the input device. However, other force profiles, including compound force profiles, may also be implemented. Further, if an auto-pilot system is engaged, the restorative force created by the control system acts in the direction necessary to reconcile manual displacement of the input device with an input device position commanded by the auto pilot signal, rather than forcing the input device back toward the null position. The system also reflects manual displacement of each input device as a force applied to the other. For example, when a pilot moves his or her control stick forward, the co-pilot will feel a like force moving the co-pilot's control stick forward.

Figure 1:
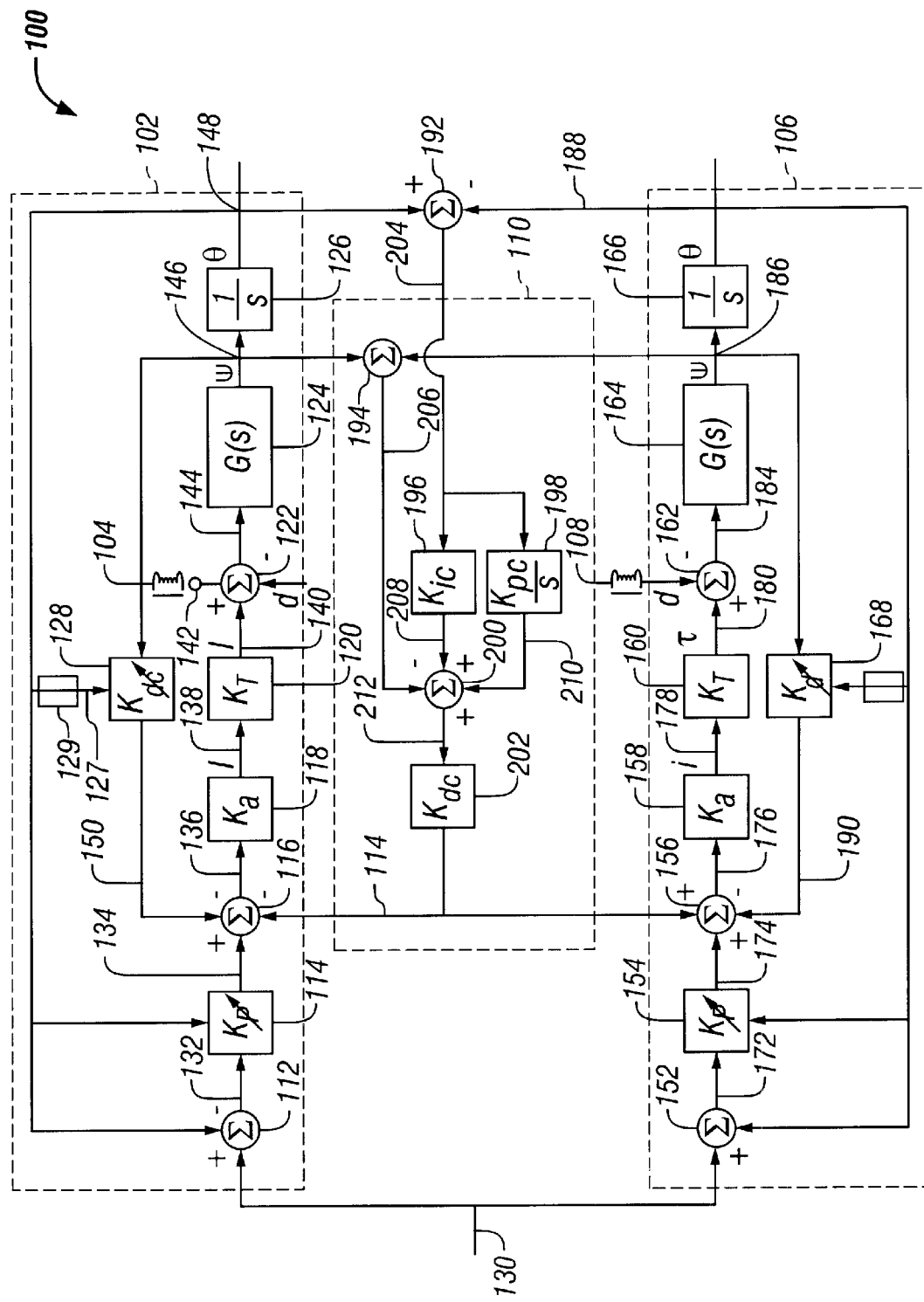
FIG. 1 is a block diagram of an active control system for providing a desired force versus displacement profile to a pair of manual input devices such as pilot and co-pilot flight control sticks.

FIG. 1 shows a block diagram 100 of an active control system according to the present invention for controlling a pair of manual input devices such as a pair of aircraft flight control sticks. A first control loop 102 shown at the top of the diagram generates and applies the restorative force applied to a first manual input device 104. A second servo control loop 106 shown at the bottom of the diagram generates and applies the restorative force applied to a second manual input 108. A cross-coupled feedback loop 110 shown in the center of the diagram provides position feedback from one input device to the other which is converted to a tactile force which is applied to either of the two input devices to indicate that the other input device has been displaced.

Turning to the first control loop 102, the first manual input device 104 receives manual input in the form of a torque signal d applied by an operator, e.g. a pilot pushing a flight control stick forward. Input device 104 is mechanically coupled to the output of a servo motor 120 which is capable of delivering torque to the input device. The torque applied to the input device 104 by the operator is subtracted from the torque output of the motor 120, as indicated at summing junction 122. The direction of torque applied by the operator will generally be directed opposite the torque output by servo motor 120. Therefore, the manually applied torque signal 142 is shown being subtracted from the output torque 140 of servo motor 120 at summing junction 122. The combined torque entered by the operator and applied by the servo motor 120 must overcome various mechanical influences built into the system in order to actually move input device 104. These mechanical influences are collectively grouped into the mechanical transfer function G(s) shown at 124. The mechanical transfer function includes the gear ratios of a gearbox (not shown) which may be interposed between the output of the servo motor and the first manual input device 104, the friction and inertia of the system and other mechanical influences. All of these mechanical influences have an impact on how the input device 104 moves, including the speed and distance of movement for a given torque input. As shown in FIG. 1, the mechanical transfer function 124 outputs an angular velocity signal ω at signal line 146. A further integration of the angular velocity results in an angular position signal θ at signal line 148. Position signal 148 may also be used to control the position or settings of external equipment such as the flight surfaces of an aircraft which input device 104 is intended to control.

The angular position signal θ is fed back to summing junction 112 to create a position feed back loop which is input to the forward loop gain amplifier 118. The magnitude of the current for driving servo motor 120 output from the forward loop gain amplifier 118 is directly related to the position signal θ fed back through the position feed back loop. At summing junction 112, the angular position signal 148 is subtracted from the autopilot signal 130. The resultant signal 132 comprises a position signal between where the autopilot is commanding the input device 104 and its actual position. If the autopilot system is not engaged, the autopilot signal 130 is 0, and the output of summing junction 112 is simply the negative of the position signal 148. Therefore, if the autopilot is not engaged, or if the autopilot is commanding the input device 104 to the null position, the force applied to the input device 104 by the active control system will be a restorative force directed opposite the direction of displacement, and the magnitude of the restorative force will be proportional to the amount of displacement. Otherwise, in the first case, with a non-zero autopilot signal the restorative force will act to correct any discrepancy between the actual position of the input device 104 and the position to which the autopilot signal is commanding it to move. In either case, the error signal 132 output from summing junction 112 is input to force profile gain amplifier 114.

Figure 2:
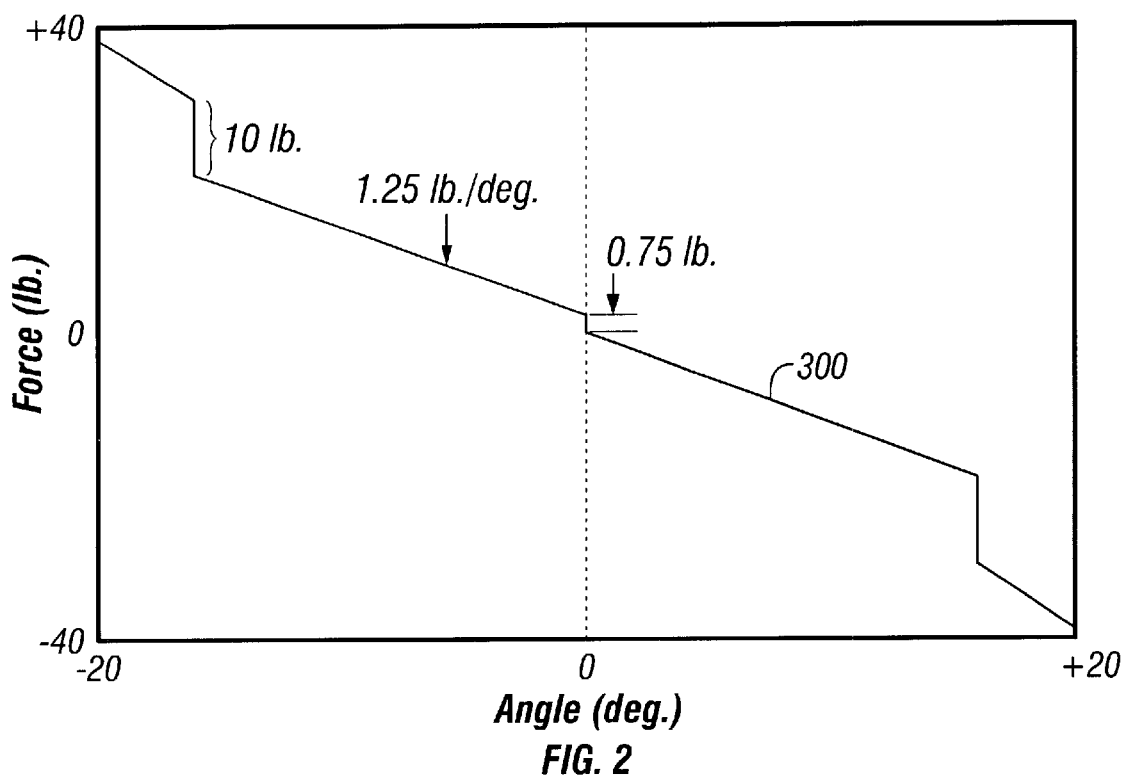
FIG. 2 is a force versus displacement curve showing a typical force profile for the input devices controlled by the active control system depicted in FIG. 1.
Figure 3:
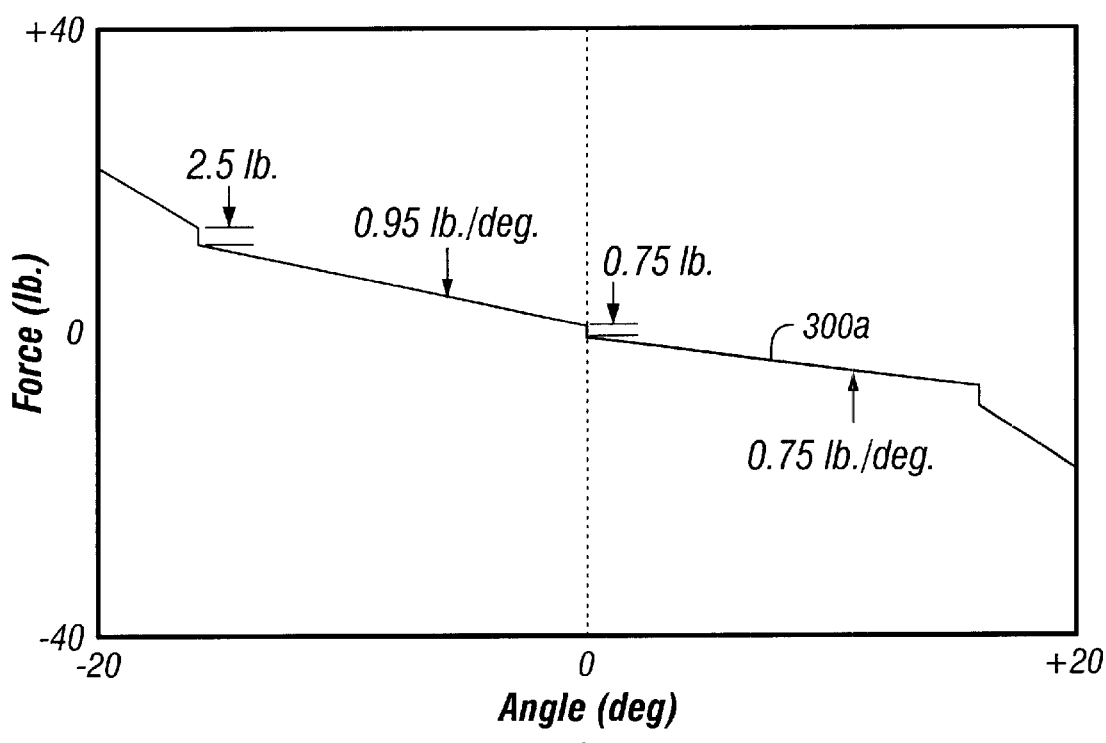
FIG. 3 is a force versus displacement curve showing an alternate force profile for the input devices controlled by the active control system depicted in FIG. 1.
Figure 4:
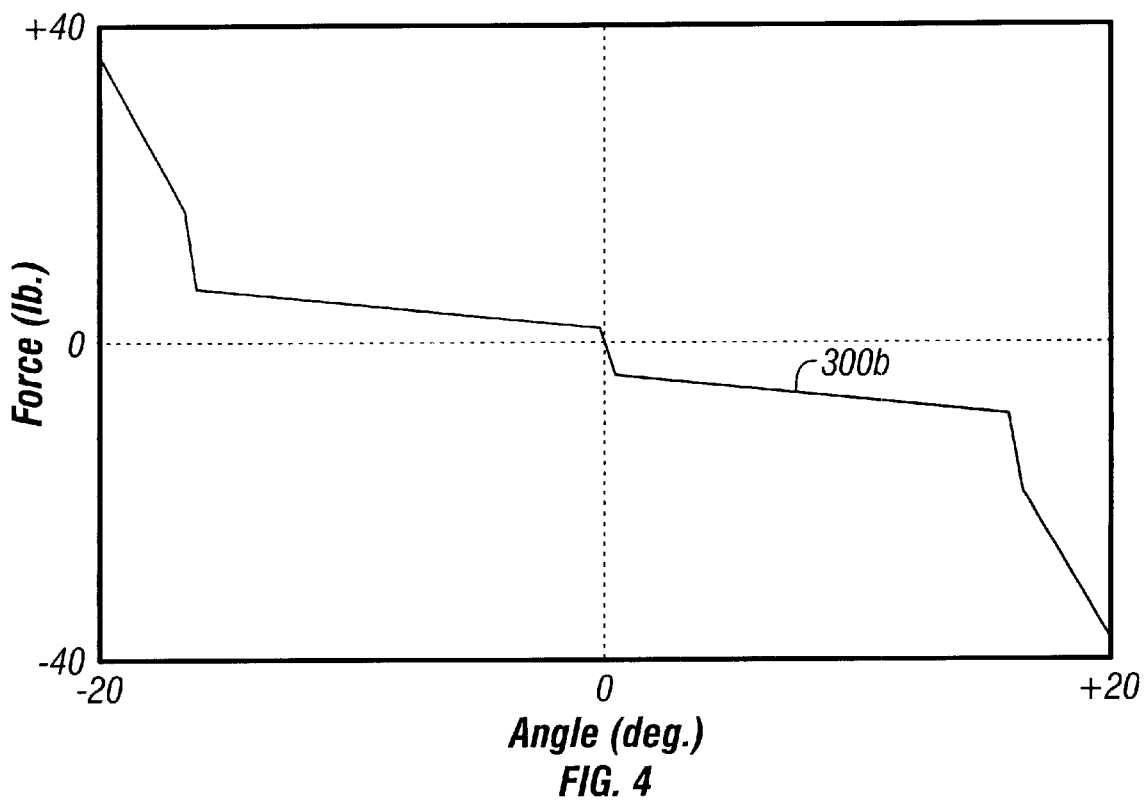
FIG. 4 is a force versus displacement curve showing another alternate force profile for the input devices controlled by the active control system depicted in FIG. 1.
Figure 5:
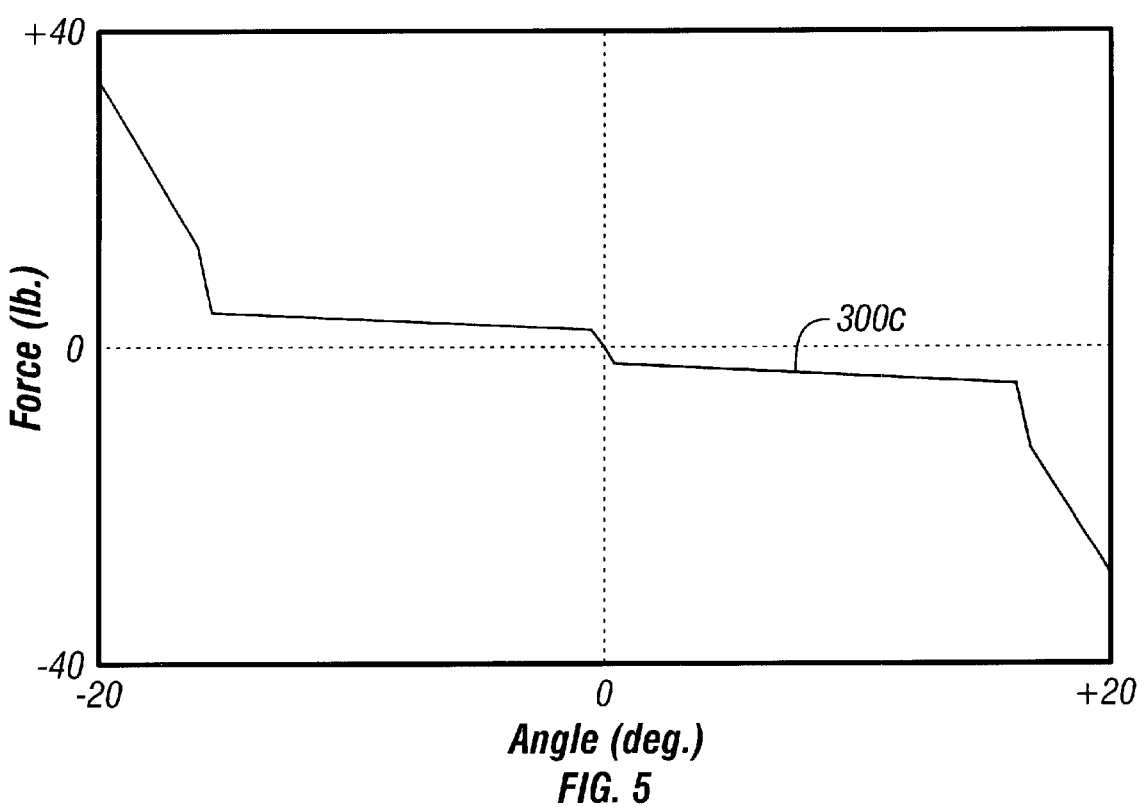
FIG. 5 is a force versus displacement curve showing yet another alternate force profile for the input devices controlled by the active control system depicted in FIG. 1.

The force profile gain amplifier 114 defines the force versus position characteristics of the restorative force applied to the first manual input device. An example of a force profile for a flight control stick employing the present system is shown at 300 in FIG. 2. The horizontal axis represents angular displacement of the control stick, with the origin representing the null position. The horizontal axis represents the amount of force necessary to move the control stick, or conversely, the restorative force applied to the control stick to resist displacement. In this example, a "breakout" force of 0.75 lbs. is provided. The control stick will not move from the null position unless a force in excess of 0.75 lbs. is applied to the input device 104 in either direction. Thereafter, the force necessary to further displace the control stick increases linearly as the control stick is further displaced from the null position. The force profile 300 comprises a compound profile. Up to approximately 15° of displacement, the profile emulates a mechanical spring loading the control stick. The centering force, acting in a direction opposite the direction of displacement, increases proportionally with the amount of displacement. At approximately 15° however, an additional 10 lbs. of force is needed to displace the control stick further. This additional force threshold is provided to alert the pilot that displacing the control stick further represents an extreme setting which could result in unsafe flying conditions. The force profile depicted in FIG. 2 may be achieved by the present active control system by providing the profile gain amplifier 114 with position dependent gain characteristics that mirror the force profile curve 300. Alternate force profile curves 300a, 300b and 300c are shown in FIGS. 3, 4 and 5. These alternate profiles may be obtained by merely changing the position dependent gain characteristics of the force profile gain amplifier 114.

The amplified position error signal 134, output from force profile gain amplifier 30, is passed through summing junction 116 where it is combined with a damping signal 50 and a cross-coupled feedback signal 114 and the combined signal 136 output from summing junction 116 is applied to the forward loop gain amplifier 118. The signal 134 represents the position error between the actual position of the input device 104 and either the null position or the position commanded by the autopilot system. The signal 136 output from summing junction 136 comprises a torque error signal which is input to the forward loop gain amplifier 118. Due to the combination with damping signal 50, transients resulting from rapid changes in position of the input device 104 are attenuated in torque error signal 136. Signal 136 also reflects manually input changes to the position of the second input device 108 due to the addition of the cross-coupled feedback signal 114. The forward loop gain amplifier 118 converts the torque error signal 136 to a motor excitation current signal 138 which drives the servo motor 120. The servo motor 120 in turn converts the current signal 138 to a torque output 140 applied to the input device 104. As has already been described, the servo motor output torque 140 is combined with torque signal d which is manually applied by the operator, and the combined torque signal 144 acts to move the input device 104. The current 138 supplied to the servo motor 120 drives the motor in the direction that reduces the magnitude of the error signal. In other words, the servo motor 120 drives input device 104 in the direction that reduces the displacement of the input 104 from either the null position or the position commanded by the autopilot system. The greater the displacement error from the null position or the position commanded by the autopilot system, the greater will be the restoring force applied to eliminate that displacement.

The velocity damping feedback loop begins with the input device angular velocity signal ω output from the mechanical transfer function G(s) at 146. The angular velocity signal is input to the damping profile amplifier 128, the output of which is fed back into summing junction 116, where it is subtracted from the amplified position error signal 134. The amount of gain applied by the damping profile amplifier 128 is dependent on the angular velocity of the input device 104 itself and angular velocity signal 127 is separately derived from the position signal 148. In addition to being fed back to summing junction 112 and profile gain amplifier 114, the position signal 148 is also fed into derivative block 129, which takes the derivative of the position signal to determine the rate at which the position signal is changing. The damping profile gain amplifier 128 provides an amount of gain that is dependent on the magnitude of the velocity signal 127. The larger the magnitude of the velocity signal 127 the more gain that damping profile amplifier 128 applies to the velocity feedback signal 146. Thus, the damping signal 50 which is subtracted from the error position signal 134 at summing junction 116 is much greater for rapid movements of the input device 104 than it is for slower, steadier movements. This has the result of smoothing out the response of the system, eliminating chatter at or around the null or autopilot commanded position, while maintaining a firm tactile response to deliberate manual input applied to the input device 104.

The second servo control loop 106 is substantially identical to the first servo control loop 102. The second manual input device 108 receives manual input in the form of a torque signal applied by an operator, e.g. a co-pilot pushing a flight control stick forward. Input device 108 is mechanically coupled to the output of a servo motor 160 which delivers torque to the second input device 108. The torque supplied by the motor and the manually input torque signal d supplied by the operator are combined at summing junction 162 and act against the mechanical transfer function G(s), the output from the mechanical transfer function 164 comprising an angular velocity signal Omega at 164. The angular velocity signal is input to a position sensor 166 which generates a position signal θ at 188. The position signal 188 is fed back to summing junction 152 to form a position feedback loop. The position signal is subtracted from the autopilot signal 130 at summing junction 152 in the same manner described above with regard to the position signal 148 of the first servo control loop 102. The position error signal 172 output from junction 152 is input to force profile gain amplifier 154 which operates in an identical manner to the force profile gain amplifier 114. As with the first servo control loop 102, the position feedback signal 188 is input to the force profile gain amplifier 154 to provide a variable gain consistent with the desired force versus displacement profile established for the system. The amplified position error signal 174 output from the force profile gain amplifier 154 is input to summing junction 156 where it is combined with a damping signal 190 output from a profile damping amplifier 168 and the cross-coupled feedback signal 114. The combined signal 176 output from summing junction 156 comprises a torque error signal which is input to the forward loop gain amplifier 158. The forward loop gain amplifier converts the torque error signal into a current signal for driving servo motor 160. The position loop and dampening loop of the second servo control loop 106 operate in the same manner as the position loop and damping loop of the first servo control loop 102.

In addition to forming the position feedback loops of the first and second servo control loops 102 and 106, the position output signals 148 and 188 which indicate the position of the first and second manual input devices 104, 108, respectively, may be used to drive external equipment such as motors and the like for manipulating the flight control surfaces of an aircraft in a conventional manner. The position signals 148 and 188 are further input to summing junction 192 which forms a part of the cross-coupling feedback loop 110. At summing junction 192 the position signal from the second manual input device in 108 is subtracted from the position signal 148 of the first manual input device 104 to create a position error signal 204 at the output of the summing junction. The position error signal 204 is input to a position gain amplifier 196 and a position integral gain amplifier 198. The output of the position gain amplifier 196 and the position integral gain amplifier 198, signals 208 and 210 respectively, are added together at summing junction 200. Additionally, summing junction 194 subtracts the velocity signal 186 of second manual input device 108 from the velocity signal 146 of first manual input device 104 to create a velocity error signal 206. Velocity error signal 206 is in turn subtracted from the output signals 208 and 210 from the position gain amplifier 196 and position integral gain amplifier 198 at summing junction 200. The output signal 212 from summing junction 200 comprises a conventional PID feedback signal as it is known in the art. This signal 212 is amplified by the cross-coupling gain amplifier 202 which produces a cross-coupling signal 114. The cross-coupling-signal 114 is subtracted from the amplified position error signal 134 of the first servo control loop 102 controlling the force versus displacement characteristics of the first manual input device 104, and added to the amplified position error signal 174 of the second servo control loop 106 controlling the force versus displacement characteristics of the second manual input device 108.

The position gain amplifier 196 amplifies the position error between the first input device 104 and the second input device 108. The position error integral gain amplifier 198 accumulates the position error over time and outputs a signal proportional to the magnitude of the position error and the amount of time which the position error has existed. Thus, the output signal from the position error integral gain amplifier will compensate for small position errors which taken alone are too small to overcome the mechanical influences of the system. The velocity error signal 206 is subtracted from the position error and position error integral signals to eliminate transients created by small rapid changes in the position of the first or second input devices 104, 108. The cross-coupling gain amplifier 202 amplifies the signal 212 to provide the desired amount of reflected force at each of the first and second manual input devices 104, 108. It should be noted that the cross-coupling feedback signal 114 is subtracted from the position error signal 134 of the first servo control loop 102, and added to the position error signal 174 of the second servo control loop 106. This is necessary so that movement of the first input device 104 results in a force being applied to the second input device in the direction of displacement of the first input device relative to the position of the second input device. The converse is also true. If the second input device is displaced relative to the first input device, a force is applied to the first input device in the direction of displacement of the second input device relative to the first. Of course, the addition and subtraction operations could be reversed. In other words, signal 114 could be added to the position error signal 134 at summing junction 116 and subtracted from the position error signal 174 at summing junction 156 with no net effect on the system. The gain of cross-coupling gain amplifier 202 may be set very high to provide a very stiff response to discrepancies between the position of the two input devices in order to synchronize their position.

In this manner, the active control system of the present invention provides desired tactile feedback to the operators of the two manual input devices 104, 108. The force profile defining the force versus displacement characteristics of the system may be established as desired by establishing the proper gain characteristics of the force profile gain amplifiers 114, 154. Further, the system provides a restorative force directed in a direction opposite the direction of displacement from the zero or null position, or a corrective force directed to reconcile the actual position of the input devices with the position commanded by the autopilot system. And finally, the system provides a tactile indication at each input device of what is occurring at the other input device, in the form of a force applied to the input devices reflecting a discrepancy in the position of the two devices.

It should be noted that various changes and modifications to the present invention may be made by those of ordinary skill in the art without departing from the spirit and scope of the present invention which is set out above and in the appended claims. Furthermore, those of ordinary skill in the art will appreciate that the foregoing description is by way of example only, and is not intended to be limiting of the invention as described in the appended claims.

What is claimed is:

1. An active control system for applying desired force versus displacement characteristics to each of a first input device and a second input device, each input device being configured to receive a manual torque input for angularly displacing the input device about a control axis associated therewith, the active control system comprising:

first and second motors coupled to the first and second input devices for applying a restorative torque to the first and second input devices about their respective control axes;

a first servo control loop associated with the first motor and a second servo control loop associated with the second motor, each servo control loop comprising a position sensor for generating a position signal indicative of the angular position of the input device associated therewith, a force profile gain amplifier, and a servo controller, the force profile gain amplifier receiving and amplifying a position error signal derived from the position signal, the gain of the force profile amplifier being a function of the angular position of the input device, the output of the force profile gain amplifier comprising a torque error signal input to the servo controller, the servo controller generating current of polarity and magnitude to drive the motor in a direction opposite the direction of displacement of the input device, applying a restorative torque to the input device having a magnitude proportional to the magnitude of the error signal input to the servo controller; and a cross-coupling feedback loop for reflecting the relative positions of the first and second input devices in the torque error signal input to the servo controllers associated with the first and second servo control loops so that the torque applied to the first and second input devices acts to reconcile the positions therebetween.

2. The active control system of claim 1 further comprising a command signal representing an angular position to which the first and second input devices are being commanded by an external control system, the position error signals associated with the first and second servo control loops comprising the angular position signal associated with each respective input device subtracted from the command signal.

3. The active control system of claim 2 wherein each of the first and second servo control loops further comprise a velocity damping loop wherein an angular velocity signal proportional to the angular velocity of the input device is amplified by a damping profile amplifier, and a velocity damping signal output from the damping profile amplifier is subtracted from the torque error signal.

4. The active control system of claim 3 wherein the damping profile amplifier has a variable gain output which is a function of the angular velocity of the input device.

5. The active control system of claim 2 wherein the cross-coupling feedback loop includes a relative position signal comprising the difference between the angular position signal of the second input device and the angular position signal of the first input device, and a proportional gain amplifier for amplifying the relative position signal.

6. The active control system of claim 5 wherein the cross-coupling feedback loop further includes an integrating amplifier for integrating the relative position signal.

7. The active control system of claim 6 wherein the cross-coupling feedback loop further comprises a relative velocity signal comprising the difference between the first input device angular velocity signal and the second input device angular velocity signal.

8. The active control system of claim 7 wherein an integrated relative position signal output from the integrating amplifier is added to the proportionally amplified relative position signal output from the proportional gain amplifier and the relative velocity signal is subtracted from the integrated relative position signal and the proportionally amplified relative position signal to form a cross-coupled position signal.

9. The active control system of claim 8 wherein the cross-coupling feedback loop further comprises a cross-coupled damping amplifier for amplifying the cross-coupled position signal, the damped cross-coupled position signal output from the cross-coupling damping amplifier being added to the torque error signal of one of the first and second servo control loops and subtracted from the torque error signal of the other of the first and second servo control loops.

10. The active control system of claim 1 wherein the cross-coupling feedback loop comprises a damped proportional integral derivative signal based on the difference between the position signal associated with the first input device, and the position signal associated with the second input device.

11. An active control system for supplying tactile feedback to a pair of manual input devices comprising:
    first and second manual input devices, each adapted to receive input in the form of a manual torque applied to displace the input device about a control axis;
    first and second servo control loops each comprising a servo motor coupled to a respective one of the input devices to apply a controlled restoring torque thereto about the associated control axis, and a servo controller for providing drive current to the motor of polarity necessary to drive the motor in a direction reducing the magnitude of a torque error signal and of a magnitude proportional to the magnitude of the torque error signal;
    each of the first and second servo control loops further comprising a position feedback loop and a velocity feedback loop, the position feedback loop providing a position error signal proportional to the difference between the angular position of the input device and a commanded position, the position error signal being input to and amplified by a force profile gain amplifier having a variable gain output dependent on the angular position of the input device; and
    a cross-coupling feedback loop comprising a relative position error signal representing the difference in angular position between the first and second input devices, the relative position error signal being added to the error signal input to the servo controller associated with one of the first and second servo control loops, and subtracted from the error signal input to the servo controller associated with the other of the first and second servo control loops.

12. The active control system of claim 11 wherein the commanded position is determined by a command signal generated by an external control device.

13. The active control system of claim 12 wherein the first and second manual input devices comprise first and second flight control sticks, and the command signal is generated by an autopilot system.

14. The active control system of claim 11 wherein the gain of the force profile gain amplifier increases linearly with increases in angular displacement of the input device.

15. The active control system of claim 11 wherein the gain of the force profile gain amplifier comprises a compound force profile, the gain increasing linearly at a first rate with displacement of the input device over a first range of displacement angles, and increasing linearly at a second rate over a second range of displacement angles.

16. The active control system of claim 11 wherein the cross-coupling feedback loop comprises a damped proportional integral derivative signal based on the difference between an angular position signal associated with the first input device, and an angular position signal associated with the second input device.

17. The active control system of claim 11 wherein the velocity feedback loop comprises a velocity signal representing the angular velocity of the input device which is input to a velocity damping profile amplifier having a variable gain output depending on the magnitude of the velocity signal.

18. An active control system for applying a restorative torque to a pair of self-centering manual input devices, the system comprising:
    a first servo loop configured to apply a restorative torque to a first input device;
    a second servo loop configured to apply a centering torque to a second input device;
    a cross-coupled feedback loop wherein a first position signal indicative of an angular position of the first input device is fed back to the second servo loop to influence the magnitude of the restorative torque applied to the second input device, and a second position signal indicative of an angular position of the second input device is fed back to the first servo control loop to influence the magnitude of the restorative torque applied to the first input device; and
    wherein each of the first and second servo loops includes a velocity damping feedback loop comprising a velocity signal indicative of the angular velocity of the associated input device, and a velocity profile damping amplifier having a velocity sensitive variable gain for amplifying the velocity feedback signal.

19. The active control system of claim 18 wherein the cross-coupled feedback loop includes a relative position signal comprising the difference between an angular position signal associated with the second input device and an angular position signal associated with the first input device, and a proportional gain amplifier for amplifying the relative position signal.

20. The active control system of claim 19 wherein the cross-coupled feedback loop further includes an integrating amplifier for integrating the relative position signal.

21. The active control system of claim 20 wherein the cross-coupled feedback loop further comprises a relative velocity signal comprising the difference between a first input device angular velocity signal and a second input device angular velocity signal.

22. The active control system of claim 21 wherein an integrated relative position signal output from the integrating amplifier is added to a proportionally amplified relative position signal output from the proportional gain amplifier and the relative velocity signal is subtracted from the integrated relative position signal and the proportionally amplified relative position signal to form a cross-coupled position signal.

23. The active control system of claim 22 wherein the cross-coupled feedback loop further comprises a cross-coupled damping amplifier for amplifying the cross-coupled position signal, the damped cross-coupled position signal output from the cross-coupled damping amplifier being added to a torque error signal associated with of one of the first and second servo control loops and subtracted from a torque error signal associated with the other of the first and second servo control loops.

* * * * *